United States Patent
Yoda

(10) Patent No.: US 7,382,510 B2
(45) Date of Patent: Jun. 3, 2008

(54) ACTUATOR

(75) Inventor: Mitsuhiro Yoda, Suwa (JP)

(73) Assignee: Seiko Epson Corporation (JP)

( * ) Notice: Subject to any disclaimer, the term of this patent is extended or adjusted under 35 U.S.C. 154(b) by 285 days.

(21) Appl. No.: 10/934,331

(22) Filed: Sep. 3, 2004

(65) Prior Publication Data

US 2005/0088715 A1    Apr. 28, 2005

(30) Foreign Application Priority Data

Sep. 5, 2003  (JP)  ............... 2003-314502
Aug. 19, 2004 (JP)  ............... 2004-239345

(51) Int. Cl.
*G02B 26/08*  (2006.01)
*H02N 1/00*  (2006.01)

(52) U.S. Cl. ............ 359/224; 359/198; 359/199; 310/309

(58) Field of Classification Search ............ None
See application file for complete search history.

(56) References Cited

U.S. PATENT DOCUMENTS 5,543,956 A * 8/1996 Nakagawa et al. ......... 359/225

FOREIGN PATENT DOCUMENTS

| JP | A-6-269186 | 9/1994 |
| JP | 07-092409  | 4/1995 |
| JP | A-9-90249  | 4/1997 |
| JP | 3003429    | 11/1999 |

OTHER PUBLICATIONS

Silicon Torsional Scanning Mirror, Kurt E. Petersen, IBM J. Res. Develop., vol. 24, No. 5, Sep. 1980.
Pages 753 and 754 of Japanese article (and 5 page English translation entitled "Study of Micro Mechanics Using Si (Second Report)"), no date.

* cited by examiner

*Primary Examiner*—James Phan
(74) *Attorney, Agent, or Firm*—Harness, Dickey & Pierce, P.L.C.

(57) ABSTRACT

An actuator of the type employing a two-degree-of-freedom vibration system includes a first mass portion, a second mass portion, a pair of supporting portions, as least a pair of first elastic connecting portions which connects the first mass portion to the supporting portion so that the first mass portion can rotate with respect to the supporting portion, and at least a pair of second elastic connecting portions which connects the second mass portion to the first mass portion so that the second mass portion can rotate with respect to the first mass portion. The first mass portion is driven by the application of an alternating voltage, causing the second mass portion to rotate, and the frequency of the alternating voltage is set so as to be substantially the same as a lower resonance frequency of resonance frequencies of the two-degree-of-freedom vibration system at which the first mass portion and the second mass portion resonate. This makes it possible to provide the actuator capable of operating at high speed and at low voltage and achieving a large rotation angle.

6 Claims, 6 Drawing Sheets

ACTUATOR

BACKGROUND OF THE INVENTION

1. Field of the Invention

The present invention relates to an actuator, and in particular relates to an actuator of the type employing a two-degree-of-freedom vibration system.

2. Description of the Prior Art

There is known a polygon mirror (rotary polyhedron), which is used in an optical scanner provided in laser printers, for example. In such a printer, in order to achieve higher-resolution and higher-quality printed output as well as higher-speed printing, it is necessary to rotate the polygon mirror at higher speed. Currently, an air bearing is used to rotate the polygon mirror at high speed with stability. However, there is a problem in that it is difficult to rotate the polygon mirror at much higher speed than the speed available at the present. Further, although a larger motor is required in order to rotate the polygon mirror at higher speed, use of such a larger motor arises a problem in that it is difficult to miniaturize the size of an apparatus in which the polygon mirror is used. Furthermore, use of such a polygon mirror arises another problem in that the structure of the apparatus becomes necessarily complicated, thus leading to increased manufacturing cost.

On the other hand, a single-degree-of-freedom torsional vibrator as shown in FIG. 8 has been proposed since the early stages of research in the filed of actuators. Since this vibrator uses flat electrodes which are arranged in parallel with each other, it can have quite simple structure (see K. E. Petersen: "Silicon Torsional Scanning Mirror", IBMJ. Res. Develop., Vol. 24 (1980), P. 631, for example). Further, a single-degree-of-freedom electrostatic drive type vibrator obtained by modifying the torsional vibrator described above so as to have a cantilever structure has also been proposed (see Kawamura et al.: "Research in micromechanics using Si", Proceedings of the Japan Society for Precision Engineering Autumn Conference (1986), P. 753, for example).

FIG. 8 shows such a single-degree-of-freedom electrostatic drive type torsional vibrator. In the torsional vibrator, a movable electrode plate 300 made of monocrystalline silicon is fixed at end fixing portions 300a thereof to the both ends of a glass substrate 1000 through spacers 200. The movable electrode plate 300 includes a movable electrode portion 300c which is supported by the end fixing portions 300a through narrow torsion bars 300b. Further, a fixed electrode 400 is provided on the glass substrate 1000 so as to be opposed to the movable electrode portion 300c through a predetermined electrode interval. Specifically, the fixed electrode 400 is arranged in parallel with the movable electrode portion 300c through the electrode interval therebetween. The fixed electrode 400 is connected to the movable electrode plate 300 via a switch 600 and a power source 500.

In the torsional vibrator having the structure described above, when a voltage is applied across the movable electrode portion 300c and the fixed electrode 400, the movable electrode portion 300c rotates around the axis of the torsion bars 300b due to electrostatic attraction. Since electrostatic attraction is inversely proportional to the square of an electrode interval, it is preferable for this type of electrostatic actuator to have a small electrode interval between the movable electrode portion 300c and the fixed electrode 400. However, in such a single-degree-of-freedom torsional vibrator described above, the movable electrode portion 300c which serves as a movable portion is also provided with the electrode. Therefore, if the electrode interval becomes too small, a movable range (rotation angle) of the movable electrode portion is necessarily limited. On the other hand, in order to enlarge the movable range of the movable electrode portion, it is necessary to widen the electrode interval and this in turn needs a large driving voltage. Namely, such a single-degree-of-freedom torsional vibrator described above involves a problem in that it is difficult to achieve both of low-voltage driving and large displacement.

SUMMARY OF THE INVENTION

It is therefore an object of the present invention to provide an actuator capable of operating at high speed and at low voltage and achieving a large displacement (that is, large rotation angle or large deflection angle).

In order to achieve the object, the present invention is directed to an actuator of the type employing a two-degree-of-freedom vibration system, the actuator comprising:

a first mass portion;

a second mass portion;

a supporting portion;

at least a pair of first elastic connecting portions which connects the first mass portion to the supporting portion so that the first mass portion can rotate with respect to the supporting portion; and at least a pair of second elastic connecting portions which connects the second mass portion to the first mass portion so that the second mass portion can rotate with respect to the first mass portion, wherein the first mass portion is driven by the application of an alternating voltage, causing the second mass portion to rotate, and the frequency of the alternating voltage is set so as to be substantially the same as a lower resonance frequency of resonance frequencies of the two-degree-of-freedom vibration system at which the first mass portion and the second mass portion resonate.

According to the present invention described above, it is possible to provide an actuator capable of operating at high speed and at low voltage and achieving a large rotation angle (that is, large deflection angle). Further, it is also possible to increase a rotation angle (deflection angle) of the second mass portion while vibration (amplitude) of the first mass portion is suppressed.

In the actuator according to the present invention, it is preferred that the actuator comprises a counter substrate provided so as to be opposed to the supporting portion through a predetermined distance, the counter substrate having a surface facing the supporting portion, and a pair of electrodes provided on the surface of the counter substrate at a position corresponding to the position of the first mass portion, wherein the first mass portion is driven by electrostatic force generated between the electrodes and the first mass portion. This makes it possible to further increase a rotation angle (deflection angle) of the second mass portion.

In the actuator according to the present invention, it is also preferred that the counter substrate includes an opening at a position corresponding to the position of the second mass portion. Such an actuator makes it possible to prevent a contact between the second mass portion and the counter substrate when the second mass portion rotates, and as a result, it is possible to further increase a rotation angle (deflection angle) of the second mass portion.

In the actuator according to the present invention, it is also preferred that the second mass portion includes a light reflection portion. Such an actuator makes it possible to change optical (light) path easily when it is used in an optical scanner, for example.

In the actuator according to the present invention, it is also preferred that when the spring constant of the first elastic connecting portion is defined as $k_1$ and the spring constant of the second elastic connecting portion is defined as $k_2$, $k_1$ and $k_2$ satisfy the relation: $k_1 > k_2$. This makes it possible to further increase the rotation angle (deflection angle) of the second mass portion while vibration (amplitude) of the first mass portion is suppressed.

In the actuator according to the present invention, it is also preferred that when the mass of the first mass portion is defined as $m_1$ and the mass of the second mass portion is defined as $m_2$, $m_1$ and $m_2$ satisfy the relation: $m_1 \leq m_2$. This makes it possible to further increase the rotation angle (deflection angle) of the second mass portion while the vibration (amplitude) of the first mass portion is suppressed.

In the actuator according to the present invention, it is also preferred that at least one of the pair of first elastic connecting portions and the pair of second elastic connecting portions includes a piezoresistive element. This makes it possible to detect rotation angles and rotation frequencies, for example. Further, it is also possible to utilize the detection results to control the attitude of the second mass portion.

The above and other objects, structures and advantages of the present invention will be more apparent when the following description of the preferred embodiments will be considered taken in conjunction with the accompanying drawings.

DETAILED DESCRIPTION OF THE INVENTION

Hereinafter, preferred embodiments of an actuator according to the present invention will be described with reference to the appended drawings.

Figure 1:
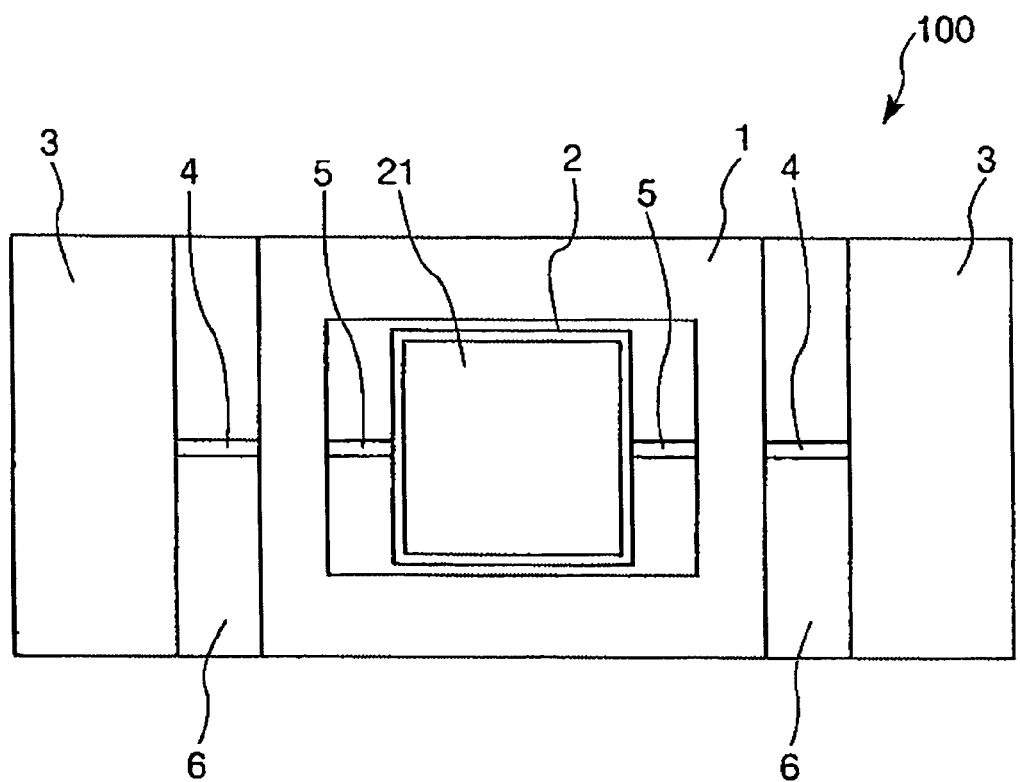
FIG. 1 is a plan view which shows a first embodiment of the actuator according to the present invention.
Figure 3:
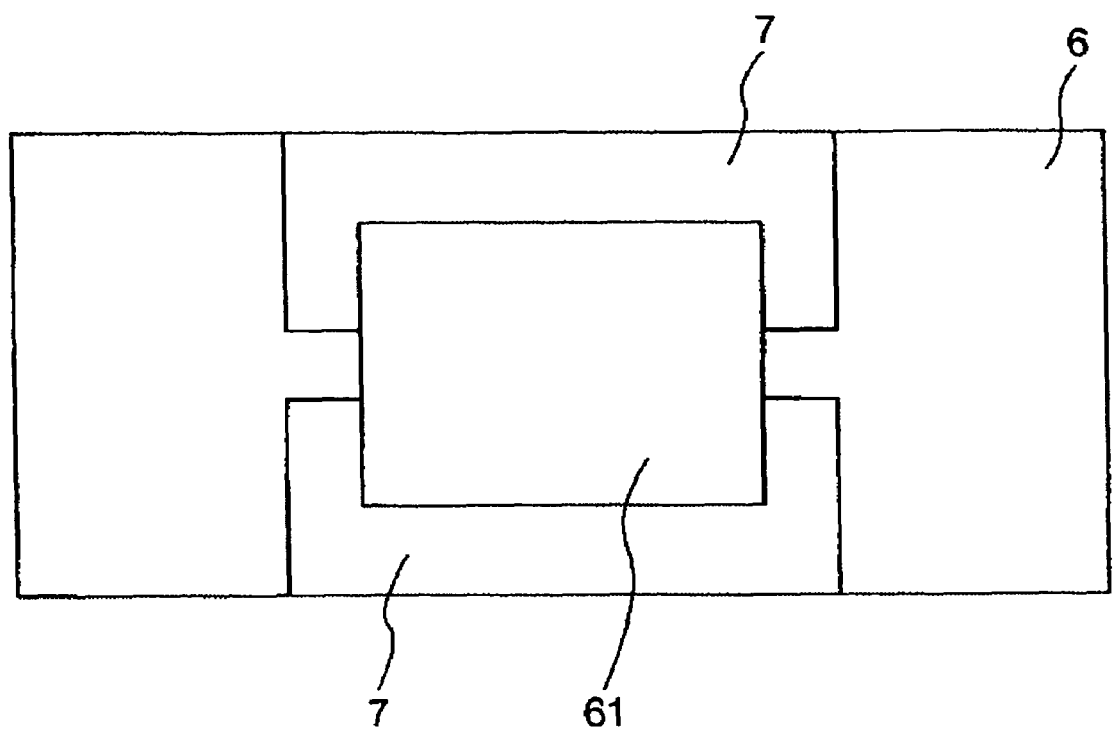
FIG. 3 is a plan view which shows a counter substrate and electrodes of the first embodiment.
Figure 4:
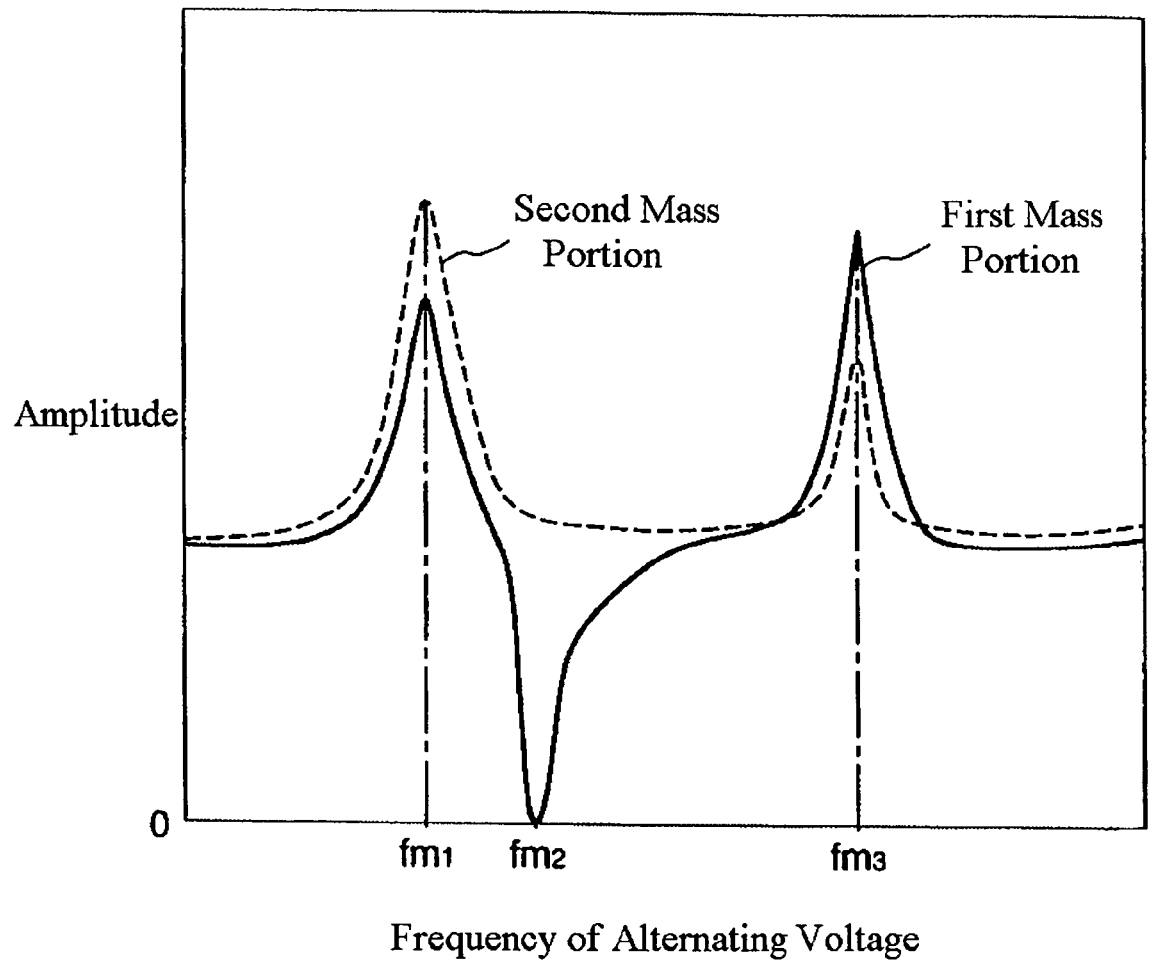
FIG. 4 is a graph which shows the frequency of an alternating voltage applied and the resonance curves of a first mass portion and a second mass portion.

First, a first embodiment of the actuator according to the present invention will be described. FIG. 1 is a plan view which shows the first embodiment of the actuator according to the present invention, FIG. 2 is a cross-sectional view which shows the first embodiment of the actuator according to the present invention, FIG. 3 is a plan view which shows a counter substrate and electrodes of the first embodiment, and FIG. 4 is a graph which shows the frequency of an alternating voltage applied and the resonance curves of a first mass portion and a second mass portion.

An actuator 100 shown in FIG. 1 includes a first mass portion (that is, a driving portion) 1, a second mass portion (that is, a movable portion) 2, and a pair of supporting portions 3. Each of the first mass portion 1, the second mass portion 2, and the supporting portions 3 is made of silicon or the like, for example. On the surface of the second mass portion 2 of this embodiment (that is, the surface of the second mass portion 2 which does not face a counter substrate 6 which will be described later), there is provided a light reflection portion 21.

Further, as shown in FIG. 1, the actuator 100 includes a pair of first elastic connecting portions 4 and a pair of second elastic connecting portions 5. The pair of first elastic connecting portions 4 connect the first mass portion 1 to the supporting portions 3, respectively, so that the first mass portion 1 can rotate with respect to the supporting portions 3. The pair of second elastic connecting portions 5 connect the second mass portion 2 to the first mass portion 1, respectively, so that the second mass portion 2 can rotate with respect to the first mass portion 1.

Figure 2:
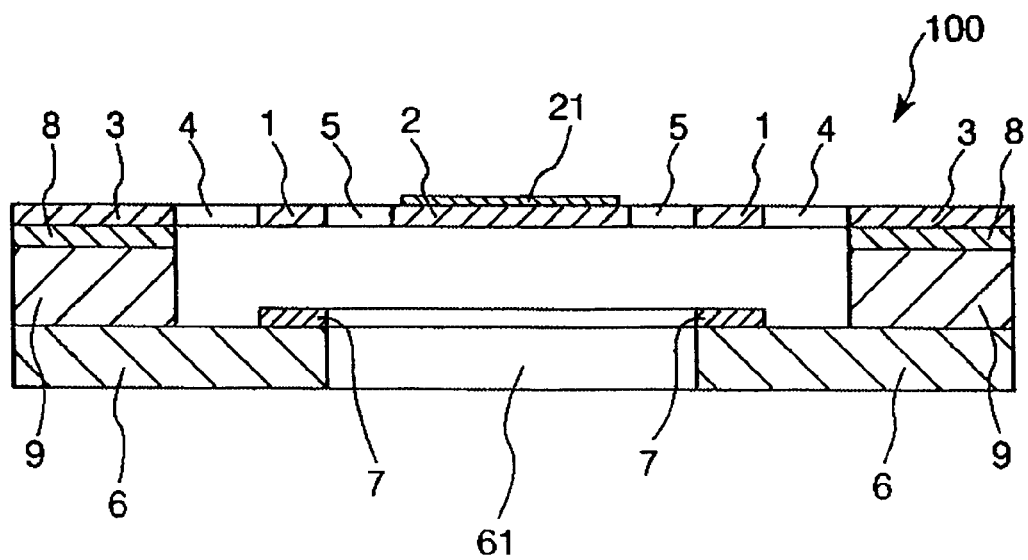
FIG. 2 is a cross-sectional view which shows the first embodiment of the actuator according to the present invention.

As shown in FIG. 2, the supporting portions 3 are joined to spacers 9 through insulating portions 8, respectively. Each of the insulating portions 8 is made of oxides or nitrides of silicon, for example, and each of the spacers 9 is made of silicon, for example. Further, as shown in FIG. 2, the actuator 100 of this embodiment includes the counter substrate 6. The counter substrate 6 is provided so as to be opposed to the supporting portions 3 through a predetermined distance. The counter substrate 6 is made of various glass materials or silicon.

As shown in FIG. 2, the supporting portions 3 are respectively supported on the counter substrate 6 through the spacers 9 and the insulating portions 8. As shown in FIG. 2 and FIG. 3, the counter substrate 6 has an opening 61 at a position corresponding to the position of the second mass portion 2. Further, on the counter substrate 6, there are provided a pair of electrodes 7 at a position corresponding to the position of the first mass portion 1. These electrodes 7 are substantially symmetrically arranged with respect to the rotational axis of the first mass portion 1 (that is, with respect to the first elastic connecting portions 4).

The electrodes 7 are connected to the first mass portion 1 via a power source (not shown in the drawings) so that an alternating voltage (driving voltage) can be applied across the first mass portion 1 and the electrodes 7. Further, an insulating film (not shown in the drawings) is provided on the surface of the first mass portion 1 (that is, the surface of the first mass portion 1 facing the electrodes 7) to prevent a short circuit. In such a two-degree-of-freedom vibration type actuator having the structure as described above, the first mass portion 1 and the first elastic connecting portions 4 constitute a first vibration system, and the second mass portion 2 and the second elastic connecting portions 5 constitute a second vibration sytem.

When an alternating voltage is applied across the first mass portion 1 and the electrodes 7, electrostatic force is generated between the first mass portion 1 and the electrodes 7. The generated electrostatic force attracts the first mass portion 1 toward the electrodes 7 so that the first mass portion 1 rotates around the axis of the first elastic connecting portions 4 (that is, the first mass portion 1 vibrates by the application of the alternating voltage). The vibration of the first mass portion 1 causes the second mass portion 2, which is connected to the first mass portion 1 through the second elastic connecting portions 5, to rotate around the axis of the second elastic connecting portions 5 (that is, the second mass portion 2 also vibrates or is deflected).

It should be noted that such a two-degree-of-freedom vibration type actuator has a frequency characteristic as shown in FIG. 4 between the amplitudes (vibrations) of the first mass portion 1 and the second mass portion 2 and the frequency of an alternating voltage applied. Namely, the two-degree-of-freedom vibration system constituted from the first mass portion 1, the first elastic connecting portions 4, the second mass portion 2 and the second elastic connecting portions 5 has two resonance frequencies $fm_1$ (kHz) and $fm_3$ (kHz) (where, $fm_1 < fm_3$) at which the amplitudes of the first mass portion 1 and the second mass portion 2 become large, and one antiresonance frequency $fm_2$ (kHz) at which the amplitude of the first mass portion 1 becomes substantially zero.

The feature of such an actuator having the structure described above resides in that the frequency F of an alternating voltage to be applied across the first mass portion 1 and the electrodes is set so as to be substantially the same as a lower resonance frequency of the two resonance frequencies, that is, the frequency F is set so as to be substantially the same as $fm_1$. By setting the frequency F (kHz) of an alternating voltage to be applied so as to be substantially the same as $fm_1$ (kHz), it is possible to increase the rotation angle (deflection angle) of the second mass portion 2 while the vibration of the first mass portion 1 is suppressed. In this regard, it is to be noted that, in this specification, the fact that F (kHz) is substantially the same as $fm_1$ (kHz) means that F and $fm_1$ satisfy the relation: $(fm_1-1) \leq F \leq (fm_1+1)$.

It is preferred that the maximum deflection angle of the second mass portion 2 with respect to a direction parallel to the surface of the counter substrate 6, on which the electrodes 7 are provided, is 20° or more. By using such an actuator as an optical scanner, for example, it becomes easy to downsize apparatuses such as laser printers. The average thickness of the first mass portion 1 is preferably in the range of 1 to 1,000 μm, more preferably in the range of 10 to 300 μm.

The average thickness of the second mass portion 2 is preferably in the range of 1 to 1,000 μm, more preferably in the range of 10 to 300 μm. The spring constant of each of the first elastic connecting portions 4 ($k_1$) is preferably in the range of $1 \times 10^{-4}$ to $1 \times 10^4$ Nm/rad, more preferably in the range of $1 \times 10^{-2}$ to $1 \times 10^3$ Nm/rad, even more preferably in the range of $1 \times 10^{-1}$ to $1 \times 10^2$ Nm/rad. By setting the spring constant of the first elastic connecting portion 4 ($k_1$) to a value within the above range, it is possible to further increase the rotation angle (deflection angle) of the second mass portion 2. Further, the spring constant of each of the second elastic connecting portions 5 ($k_2$) is preferably in the range of $1 \times 10^{-4}$ to $1 \times 10^4$ Nm/rad, more preferably in the range of $1 \times 10^{-2}$ to $1 \times 10^3$ Nm/rad, even more preferably in the range of $1 \times 10^{-1}$ to $1 \times 10^2$ Nm/rad. By setting the spring constant of the second elastic connecting portions 5 ($k_2$) to a value within the above range, it is possible to further increase the rotation angle (deflection angle) of the second mass portion 2 while the vibration of the first mass portion 1 is suppressed.

In a case where the spring constant of each of the first elastic connecting portions 4 is defined as $k_1$, and the spring constant of each of the second elastic connecting portions 5 is defined as $k_2$, it is preferred that $k_1$ and $k_2$ satisfy the relation: $k_1 > k_2$. This makes it possible to further increase the rotation angle (deflection angle) of the second mass portion 2 while the vibration of the first mass portion 1 is suppressed. Further, in a case where the mass of the first mass portion 1 is defined as $m_1$, and the mass of the second mass portion 2 is defined as $m_2$, it is preferred that $m_1$ and $m_2$ satisfy the relation: $m_1 \leq m_2$. This makes it possible to further increase the rotation angle (deflection angle) of the second mass portion 2 while the vibration of the first mass portion 1 is suppressed.

Now, the natural frequency of the first vibration system $\omega_1$ can be determined by the formula: $\omega_1 = (k_1/m_1)^{1/2}$, wherein $m_1$ represents the mass of the first mass portion 1, and $k_1$ represents the spring constant of each of the first elastic connecting portions 4. The natural frequency of the second vibration system $\omega_2$ can be determined by the formula: $\omega_2 = (k_2/m_2)^{1/2}$, wherein $m_2$ represents the mass of the second mass portion 2, and $k_2$ represents the spring constant of each of the second elastic connecting portions 5. It is preferred that the natural frequency of the first vibration system $\omega_1$ and the natural frequency of the second vibration system $\omega_2$ determined in such a manner described above satisfy the relation: $\omega_1 > \omega_2$. This makes it possible to further increase the rotation angle (deflection angle) of the second mass portion 2 while the vibration of the first mass portion 1 is suppressed.

Now, in the the actuator 100 of this embodiment, it is preferred that the actuator 100 has a piezoresistive element in at least one of the pair of first elastic connecting portions 4 and the pair of second elastic connecting portions 5 thereof. This makes it possible to detect rotation angles and rotation frequencies, for example. Further, it is also possible to utilize the detection results to control the attitude of the second mass portion 2.

Figure 5:
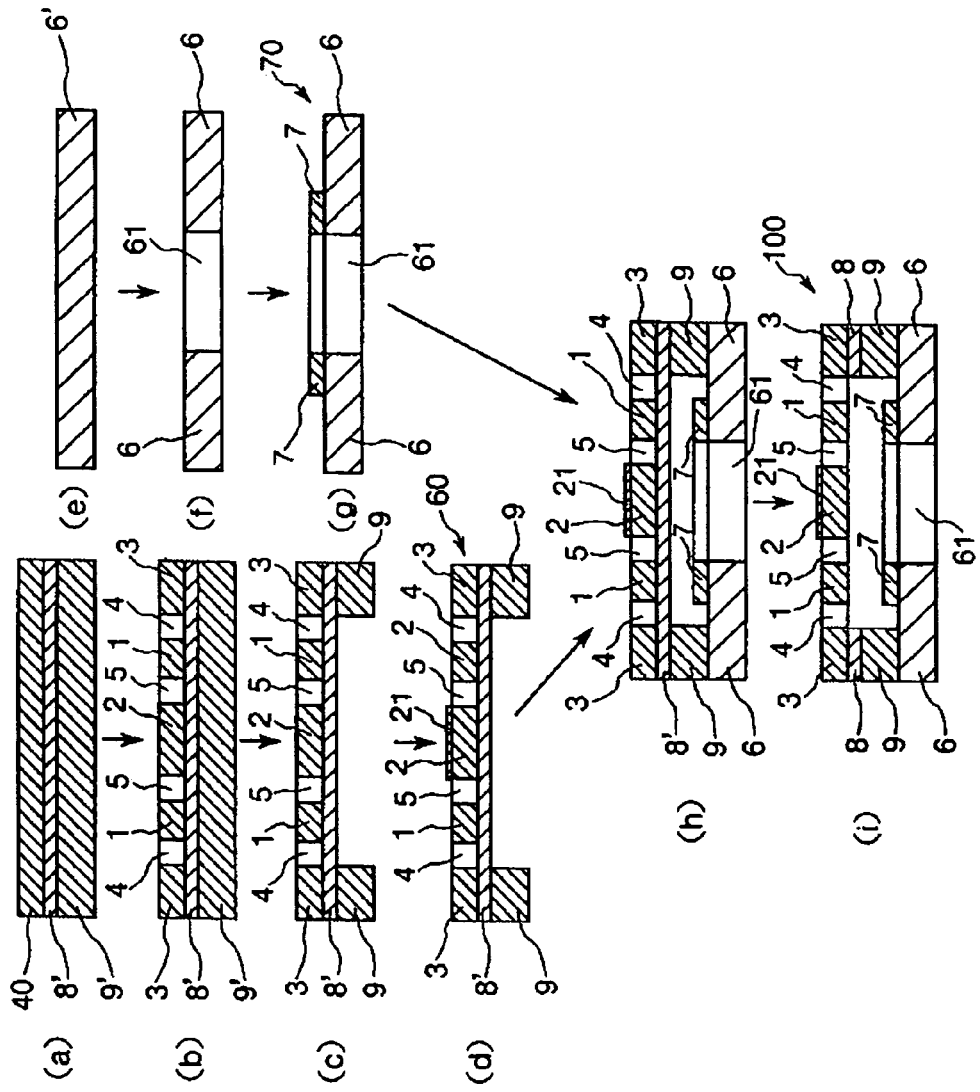
FIG. 5 is a step diagram which shows one example of a method for manufacturing the actuator according to the present invention.

Next, one example of a method for manufacturing the actuator 100 shown in FIG. 1 and FIG. 2 will be described with reference to the appended drawings. FIG. 5 is a step diagram which shows one example of a method for manufacturing the actuator 100. In this example, the actuator 100 is manufactured through the following three steps.

<First Step>

First, as shown in FIG. 5(a), an SOI substrate 50 constituted from a first Si layer 40, an $SiO_2$ layer 8', and a second Si layer 9' is prepared. Next, as shown in FIG. 5 (b), the first Si layer 40 is subjected to etching to form the first mass portion 1, the second mass portion 2, the supporting portions 3, the first elastic connecting portions 4, and the second elastic connecting portions 5. Then, as shown in FIG. 5 (c), the second Si layer 9' is subjected to etching to form the spacers 9. Then, as shown in FIG. 5 (d), the light reflection portion 21 is formed on the second mass portion 2 by a vacuum evaporation method to obtain an upper substrate 60.

<Second Step>

First, as shown in FIG. 5 (e), a glass substrate 6' is prepared. Next, as shown in FIG. 5 (f), the glass substrate 6' is subjected to etching to form the counter substrate 6 having the opening 61. Then, as shown in FIG. 5(g), the electrodes 7 are formed on the counter substrate 6 by a vacuum evaporation method to obtain a lower substrate 70.

<Third Step>

As shown in FIG. 5(h), the upper substrate 60 obtained in the first step and the lower substrate 70 obtained in the second step are bonded by anode bonding. Next, as shown in FIG. 5(i), a part of the $SiO_2$ layer 8', which is a part other than a part sandwiched between the supporting portions 3 and the spacers 9, is removed by etching to form the insulating portions 8. In this way, the actuator 100 is manufactured. In this regard, it is to be noted that the second step may be carried out concurrently with the first step, or may be carried out prior to the first step.

Figure 6:
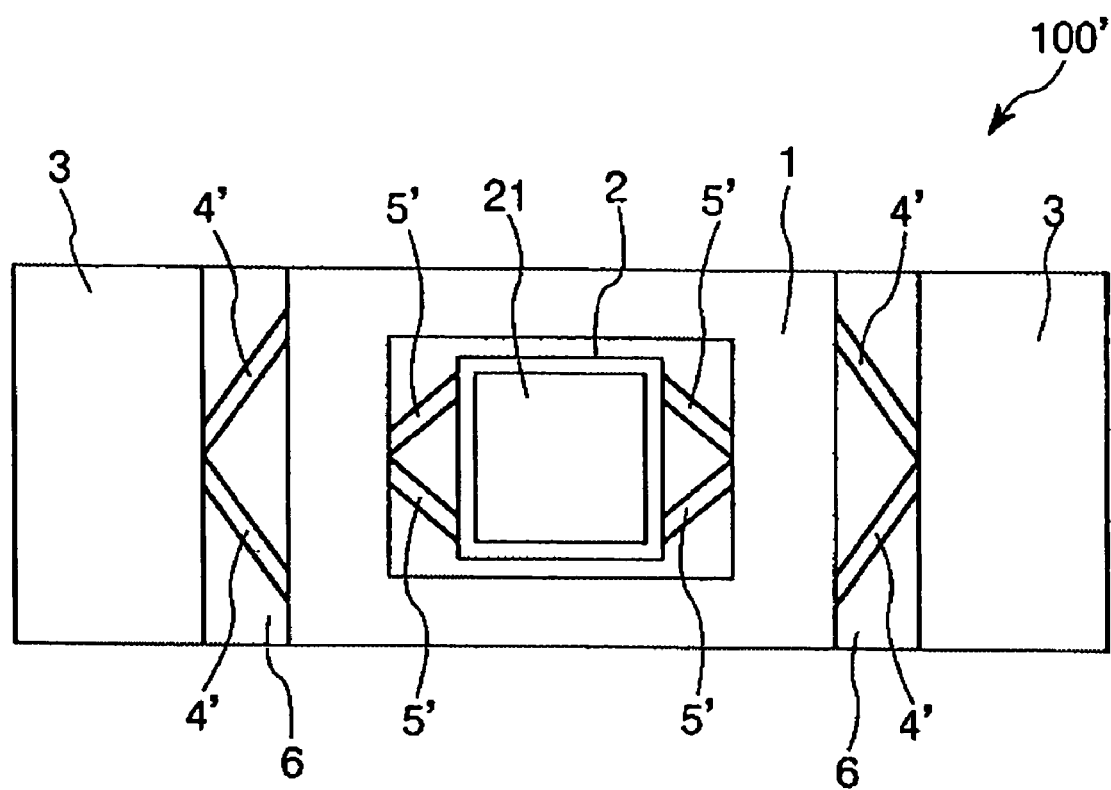
FIG. 6 is a plan view which shows a second embodiment of the actuator according to the present invention.

Next, a second embodiment of the actuator according to the present invention will be described. FIG. 6 is a plan view which shows the second embodiment of the actuator according to the present invention. Hereinafter, an actuator 100' shown in FIG. 6 will be described by focusing on the difference between the first and second embodiments, and therefore a description of the same points will be omitted. As shown in FIG. 6, the actuator 100' of this embodiment includes two pairs of first elastic connecting portions 4' and two pairs of second elastic connecting portions 5'. The two pairs of first elastic connecting portions 4' connect the first mass portion 1 to the supporting portions 3, respectively, so that the first mass portion 1 can rotate with respect to the supporting portions 3. The two pairs of second elastic connecting portions 5' connect the second mass portion 2 to the first mass portion 1, respectively, so that the second mass portion 2 can rotate with respect to the first mass portion 1.

With such a structure, it is possible to control the rotation angle (deflection angle) of the second mass portion 2 more reliably. It should be noted that, in such a case, that is, in a case where the actuator includes the two pairs of first elastic connecting portions 4' and the two pairs of second elastic connecting portions 5', the spring constant $k_1$ or $k_2$ thereof is determined on the assumption that the two elastic connecting portions connected between one of the supporting portions 3 and the first mass portion 1 are equivalent to the single elastic connecting portion of the first embodiment which is disposed at substantially the same position as the two elastic connecting portions of this second embodiment.

Figure 7:
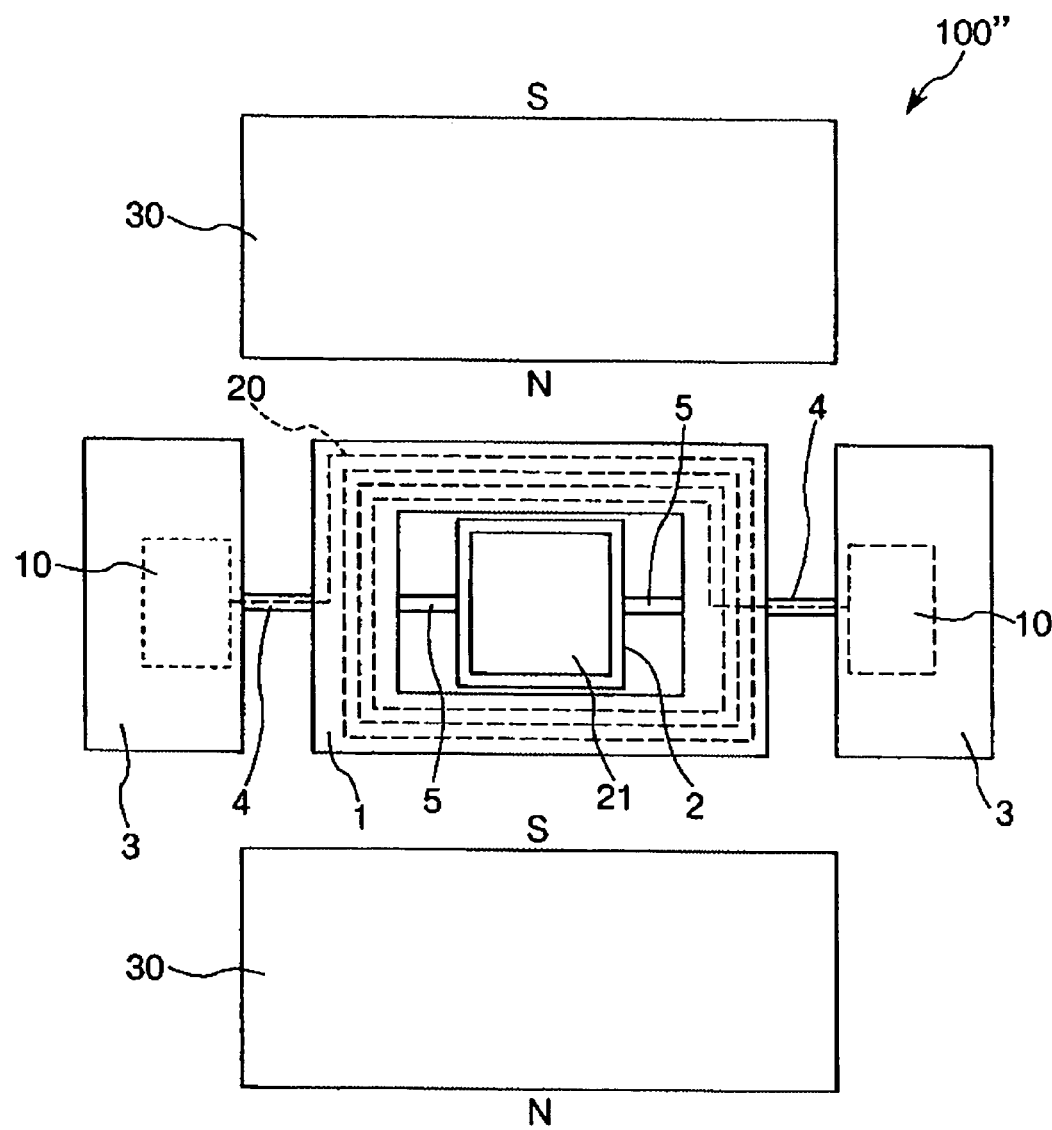
FIG. 7 is a plan view which shows a third embodiment of the actuator according to the present invention.
Figure 8:
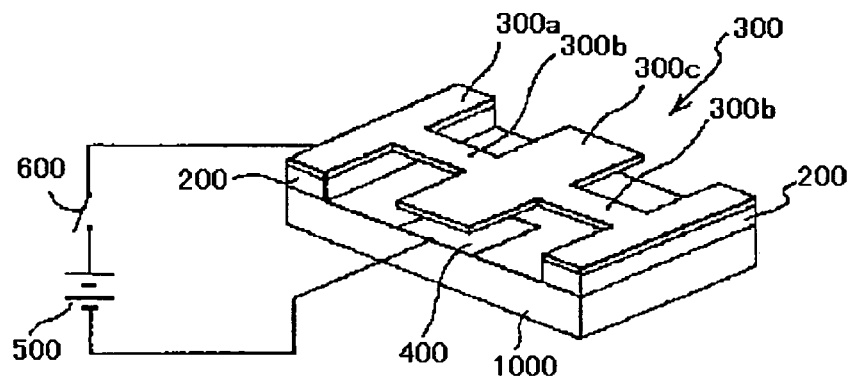
FIG. 8 is a perspective view which shows a conventional actuator.

Next, a third embodiment of the actuator according to the present invention will be described. FIG. 7 is a plan view which shows the third embodiment of the actuator according to the present invention. Hereinafter, an actuator 100" shown in FIG. 7 will be described by focusing on the difference between the first and third embodiments, and therefore a description of the same points will be omitted. The actuator 100" of this embodiment is driven by electromagnetic force (that is, by Lorentz force).

Specifically, as shown in FIG. 7, the actuator 100" includes terminals 10 provided in the supporting portions 3, respectively, a coil 20 provided on the surface of the first mass portion 1 (that is, the surface of the first mass portion 1 which does not face the counter substrate 6), a pair of permanent magnets 30 provided on both sides of the first mass portion 1 so that the first mass portion 1 is placed therebetween. The pair of permanent magnets 30 are arranged so that the south pole of one magnet 30 and the north pole of the other magnet 30 are opposed to each other. The end portions of the coil 20 are connected to the terminals 10, respectively. Further, the terminals 10 are connected to a power source (not shown in the drawings) so that an alternating voltage can be applied to the coil 20.

In this embodiment, when an alternating voltage is applied to the coil 20, Lorentz force is generated between the coil 20 (first mass portion 1) and the permanent magnets 30, and the generated Lorentz force drives the actuator 100".

The actuators described above based on the first to third embodiments can be preferably applied to optical scanners to be used in laser printers, bar-code readers, and the like, or displays for imaging, for example.

Although the actuator according to the present invention has been descried with reference to the embodiments shown in the drawings, the present invention is not limited thereto.

For example, so long as the same functions are achieved, it is possible to make various changes and additions to each portion of the actuator of the present invention. Further, each of the actuators of the embodiments described above has the pair or two pairs of first elastic connecting portions 4, but the actuator according to the present invention is not limited thereto and may have three or more pairs of first elastic connecting portions 4, for example.

Furthermore, each of the actuators of the embodiments described above has the pair or two pairs of second elastic connecting portions 5, but the actuator according to the present invention is not limited thereto and may have three or more pairs of second elastic connecting portions 5, for example.

Moreover, in each of the actuators of the embodiments described above, the light reflection portion 21 is provided on the surface of the second mass portion 2 which does not face the counter substrate 6 but in the actuator according to the present invention, the light reflection portion 21 may be provided on the opposite surface of the second mass portion 2, or may be provided on both surfaces of the second mass portion 2, for example.

Moreover, in each of the actuators of the first and second embodiments described above, the electrodes 7 are provided on the counter substrate 6, but in the actuator according to the present invention, the electrodes 7 may be provided on the first mass portion 1, or may be provided on both of the counter substrate 6 and the first mass portion 1, respectively. Moreover, each of the actuators of the first and second embodiments described above has the pair of electrodes 7, but in the actuator according to the present invention, it is not always necessary for the electrode to be used in a pair.

Moreover, in each of the actuators of the embodiments described above, the first elastic connecting portions and the second elastic connecting portions have shapes shown in the drawings, but in the actuator according to the present invention, the shapes thereof are not limited thereto and they may have a crank shape or a branched shape, for example. Moreover, in each of the actuators of the first and second embodiments described above, the insulating film is provided on the surface of the first mass portion 1, which is a surface facing the electrodes 7, for preventing a short circuit, but in the actuator according to the present invention, the insulating film may be provided on the surface of the electrodes 7 or may be provided on the surfaces of both of the first mass portion 1 and the electrodes 7, for example.

Moreover, in the actuator of the third embodiment described above, the coil 20 is provided on the surface of the first mass portion 1 which does not face the counter substrate 6, but in the actuator according to the present invention, the coil may be provided on the opposite surface of the first mass portion 1, or may be provided inside the first mass portion 1, for example. Moreover, in the example of the manufacturing method of the actuator described above, the upper substrate 60 is integrally formed, but the upper substrate 60 is not limited to one integrally formed. For example, a substrate obtained by integrally forming the first mass portion 1, the second mass portion 2, the supporting portions 3, the first elastic connecting portions 4 and the second elastic connecting portions 5 may be bonded to the lower substrate 70 through spacers formed of glass or the like. Alternatively, each of these portions may be separately formed, and then the thus obtained portions may be assembled by bonding.

This application claims priority to Japanese Patent Application Nos. 2003-314501 filed Sep. 5, 2003 and 2004-239345 filed Aug. 19, 2004 which are hereby expressly incorporated by reference herein in their entirety.

What is claimed is:

1. An actuator of the type employing a two-degree-of-freedom vibration system, the actuator comprising:

a first mass portion;
a second mass portion;
a supporting portion;
at least a pair of first elastic connecting portions which connect the first mass portion to the supporting portion so that the first mass portion can rotate with respect to the supporting portion; and
at least a pair of second elastic connecting portions which connect the second mass portion to the first mass portion so that the second mass portion can rotate with respect to the first mass portion,
wherein the first mass portion is driven by the application of an alternating voltage, causing the second mass portion to rotate, and the frequency of the alternating voltage is set so as to be substantially the same as a lower resonance frequency of resonance frequencies of the two-degree-of-freedom vibration system at which the first mass portion and the second mass portion resonate, and
wherein at least one of the pair of first elastic connecting portions and the pair of second elastic connecting portions includes a piezoresistive element.

2. The actuator as claimed in claim 1, further comprising a counter substrate provided so as to be opposed to the supporting portion through a predetermined distance, the counter substrate having a surface facing the supporting portion, and a pair of electrodes provided on the surface of the counter substrate at a position corresponding to the position of the first mass portion, wherein the first mass portion is driven by electrostatic force generated between the electrodes and the first mass portion.

3. The actuator as claimed in claim 2, wherein the counter substrate includes an opening at a position corresponding to the position of the second mass portion.

4. The actuator as claimed in claim 2, wherein the second mass portion includes a light reflection portion.

5. The actuator as claimed in claim 1, wherein when the spring constant of the first elastic connecting portion is defied as $k_1$ and the spring constant of the second elastic connecting portion is defined as $k_2$, $k_1$ and $k_2$ satisfy the relation: $k_1 > k_2$.

6. The actuator as claimed in claim 1, wherein when the mass of the first mass portion is defined as $m_1$ and the mass of the second mass portion is defined as $m_2$, $m_1$ and $m_2$ satisfy the relation: $m_1 \leq m_2$.

* * * * *